United States Patent [19]

Van Zanten et al.

[11] Patent Number: 5,211,453
[45] Date of Patent: May 18, 1993

[54] PROCESS FOR ENHANCING CONTROL OVER A BRAKED VEHICLE

[75] Inventors: Anton Van Zanten, Ditzingen; Friedrich Kost, Stuttgart; Wolf-Dieter Ruf, Waldstetten; Karl-Josef Weiss, Waiblingen; Uwe Hartmann, Stuttgart; Gerd Busch, Gerlingen, all of Fed. Rep. of Germany

[73] Assignee: Robert Bosch GMBH, Stuttgart, Fed. Rep. of Germany

[21] Appl. No.: 623,956
[22] PCT Filed: May 9, 1989
[86] PCT No.: PCT/EP89/00507
  § 371 Date: Nov. 26, 1990
  § 102(e) Date: Nov. 26, 1990
[87] PCT Pub. No.: WO89/11409
  PCT Pub. Date: Nov. 30, 1989

[30] Foreign Application Priority Data

May 24, 1988 [DE] Fed. Rep. of Germany ....... 3817546

[51] Int. Cl.⁵ ............................................. B60T 8/60
[52] U.S. Cl. ................................. 303/111; 303/24.1; 303/113.5; 364/426.02
[58] Field of Search ............. 364/426.02, 426.03; 303/100, 103, 91, 93, 106, 110, 111, 113 AP, 24.1, 104, 113 SS

[56] References Cited

U.S. PATENT DOCUMENTS

| | | | |
|---|---|---|---|
| 4,647,115 | 3/1987 | Leiber et al. | 303/100 X |
| 4,758,053 | 7/1988 | Yasuno | 303/91 |
| 4,794,539 | 12/1988 | Wallentowitz et al. | 303/100 X |
| 4,898,431 | 2/1990 | Karnopp et al. | 303/100 |
| 4,967,865 | 11/1990 | Schindler | 180/140 X |
| 4,998,593 | 3/1991 | Karnopp et al. | 180/140 |

FOREIGN PATENT DOCUMENTS

| | | | |
|---|---|---|---|
| 3602432 | 7/1987 | Fed. Rep. of Germany | 303/100 |
| 208256 | 8/1989 | Japan | 303/113 AP |

OTHER PUBLICATIONS

Bosch Technische Berichte, Heinz Leiber et al. "Antiskid System (ABS) for Passenger Cars", English Special Edition (Feb. 1982).

*Primary Examiner*—Robert J. Oberleitner
*Assistant Examiner*—Alfred Muratori
*Attorney, Agent, or Firm*—Felfe & Lynch

[57] ABSTRACT

Brake pressure is varied briefly by means of pressure pulses at regular intervals during phases when brake pressure is otherwise maintained constant, and any variations in transverse acceleration at each axle are determined. These variations at the axles are used to modify the wheel slip by varying the brake pressure in order to increase stability while retaining an adequate steerability reserve or vice versa.

4 Claims, 8 Drawing Sheets

PROCESS FOR ENHANCING CONTROL OVER A BRAKED VEHICLE

BACKGROUND OF THE INVENTION

Prior art

The invention relates to a method of improving the control of a vehicle during braking by changing the brake pressure at the wheels.

Methods which serve to improve the control over a vehicle are, for example, anti-lock brake control systems and drive-slip control systems. In conjunction with ABS, it is also known to employ yaw torque decrease and select-low-control both of which further improve control over a vehicle.

SUMMARY OF THE INVENTION

The transverse-stability reserve TSR is a measure for the instantaneous slope in the operating point of the inclined-position curve. In the method of the invention it can be described as follows:

$$TSR = -\frac{b_{y,n} - b_{y,o}}{b_{y,p} - b_{y,o}}$$

wherein $b_{y,o}$ is the initial value of the transverse acceleration $b_{y,p}$ is the transverse acceleration of the wheel during the brake slippage pulse $b_{y,n}$ is the transverse acceleration of the wheel after the brake slippage pulse.

The inclined-position curve is the known relation between the angle of the inclined position of the wheel and the lateral adhesion coefficient $\mu_s$.

The method in accordance with the invention can be used in vehicles with anti-lock brake control and/or drive slip control. These control methods are known to involve relatively long phases where the brake pressure is maintained at a constant level.

As compared to the prior art, where no statements are made on how stable and steerable a vehicle is during braking, the method of invention seeks to make such a statement in order to vary the slippage for the purpose of improving the control over the vehicle. The core of the invention is the determination of the transverse stability reserve of a vehicle axle. As already mentioned, this transverse stability reserve is a measure for the instantaneous slope, i.e. the local slope in the operating point of the inclined-position curve. When the local slope of the inclined-position curve is steep, then the transverse-stability reserve is high and an increase of the angle of the inclined position causes the adhesion coefficient for the lateral forces to greatly increase. When the local slope of the inclined-position curve is small, then transverse-stability reserve is small and an increased inclined-position angle causes the adhesion coefficient for the lateral forces to increase only to a small extent. In case the local slope of the inclined-position curve is negative, the transverse-stability reserve is also negative and an increased inclined-position angle causes the adhesion coefficient for the lateral forces to decrease.

The transverse-stability reserve is hence a measure for the lateral force reserves at the axles. A change of the brake slippages causes a change of the transverse-stability reserves and hence improves the steerability and the stability of the vehicle and/or prevents a skidding or pushing of the vehicle.

The aforesaid is based on the following considerations. Brake force and/or brake slippage of tires are known to greatly affect the transverse dynamics of a vehicle, i.e. steerability and stability thereof Generally, it can be said that longitudinal slippage at the rear wheels reduces stability. Modifying the brake slippage at the front and rear wheels can hence improve or impair steerability and stability of a vehicle. A decrease of the longitudinal slippage at the front wheels and an increase of the longitudinal slippage of the rear wheels, for example, increases the yawing tendency (steerability) of a vehicle. Vice-versa, it is possible to decrease the yawing tendency of the vehicle by increasing the longitudinal slippage at the front wheels and decreasing the longitudinal slippage at the rear wheels which means the vehicle will be stabilized. Similarly, the curve radius at the front and rear wheels can be reduced by decreasing the longitudinal slippage.

The above made statements also apply to drive slippage even though longitudinal slippage is subsequently referred to as brake slippage.

The question that arises is whether the brake slippage must be increased or decreased at the respective wheels and if so, by how much; e.g. shall the curve radius be reduced by a decrease of the brake slippage at the front and rear wheels as well as an increase of the steering angle. Since the necessary steering angles may be very great for high brake slippage values (as compared to steering maneuvers without braking), it appears to be more expedient to support the operator of the vehicle with a specific modification of the brake slippage at the wheels. Further, it appears absolutely necessary to limit the brake slippage at the rear wheels such that the maximum of the inclined-position curve is not surpassed.

If, however, the maximum of the inclined-position curve is indeed surpassed at the rear wheels, the brake pressure must be increased at the front wheels and be decreased at the rear wheels in order to stabilize the vehicle.

The key question is to what extent the operator should be supported with this specific modification of the brake slippage at the various wheels. Here, it must always be assured that any specific modification of the brake slippages does not lead to critical driving situations. In order to accomplish this, it appears to be absolutely necessary to obtain information on reserves in the.-adhesion-coefficient for the lateral forces.

DETAILED DESCRIPTION OF THE PREFERRED EMBODIMENT

Figure 1:
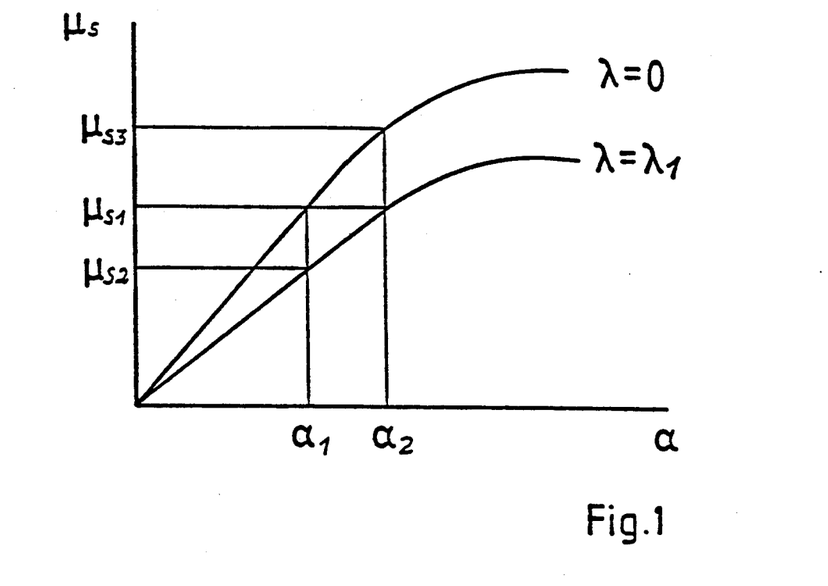
FIG. 1 is a plot of the coefficient of friction for lateral force against the angle of inclined position of a wheel, i.e. slippage curves, with and without braking.

The functional connection between the angle $\alpha$ of the inclined position of the tire and the adhesion-coefficient $\mu_s$ for the lateral forces is principally known and represented in FIG. 1. The non-linear curve showing the inclined position means that the curves will gradually become flatter as it approaches the maximum. This means increasing inclined-position angles require increasingly greater increments of the inclined-position angles in order to increase the adhesion-coefficient for the lateral forces by the same amount. If the tire is subject to braking and if it runs with a brake slippage $\lambda_1$, the adhesion-coefficient for the lateral forces is reduced as indicated.

Figure 2:
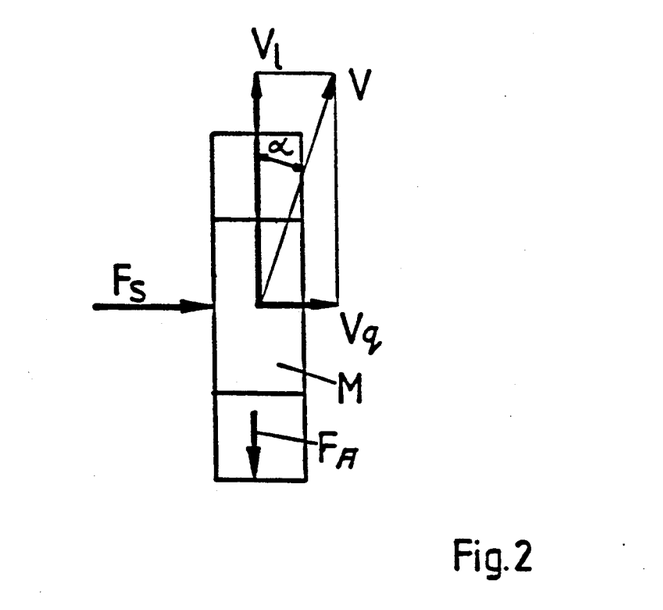
FIG. 2 is a schematic representation of the forces acting on a wheel and the velocity components of that wheel.

Referring to FIG. 2 it is assumed that the wheel with the tire moves at a constant longitudinal velocity $V_L$, that a lateral force $F_S$ acts upon the wheel and that the surface contact force of the tire is $F_A$, and the wheel mass is M. The lateral force $F_S$ gives the wheel a lateral velocity component $V_Q$ and a resulting velocity vector V which represents the direction of movement of the wheel. The angles of inclined position $\alpha$ between $V_L$ and V is defined by the relationship $\tan \alpha = V_Q/V_L$.

The lateral forces $F_S$ accounts for an adhesion-coefficient for the lateral forces at the wheel of $\mu_{s,1} = F_S/F_A$. The corresponding angle for the inclined position is $\alpha_1$. If the wheel is then subject to braking so that the brake slippage is $\lambda_1$, then the adhesion-coefficient for the lateral forces decreases to $\mu_{s,2}$, the wheel is accelerated in transverse direction with an acceleration $b_{y1}$ until the new angle $\alpha_2$ for the inclined position is set and the adhesion-coefficient $\mu_{s,1}$ for the lateral forces is reestablished. During this procedure, the angle of the inclined position and the adhesion-coefficient for the lateral forces change along the $\lambda$-curve.

If now, following this braking, the braking torque is eliminated again, the adhesion-coefficient for the lateral forces increases to $\mu_{s3}$ and the wheel is accelerated again in opposite transverse direction, by an acceleration $b_{y2}$ until the former angle $\alpha_1$ is reestablished. The flatter the inclined-position curve between $\alpha_1$ and $\alpha_2$, the smaller is the acceleration with which the wheel moves from the inclined-position angle $\alpha_2$ to inclined-position angle $\alpha_1$. This acceleration is also a measure for the local slope of the inclined-position curve.

Figure 3A:
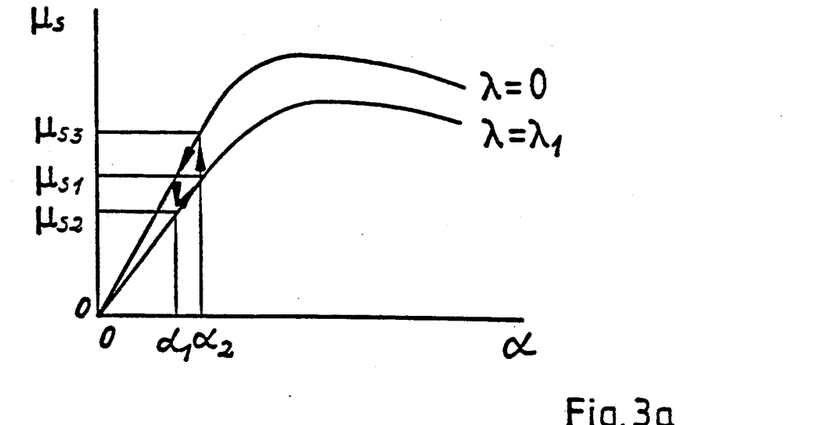
FIGS. 3a, 3b, and 3c show the slippage curves with and without braking for various angles or inclined position.
Figure 3B:
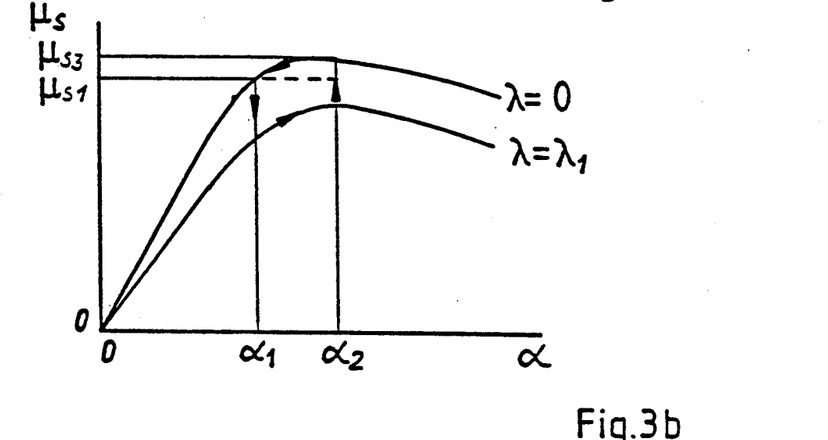
Figure 3C:
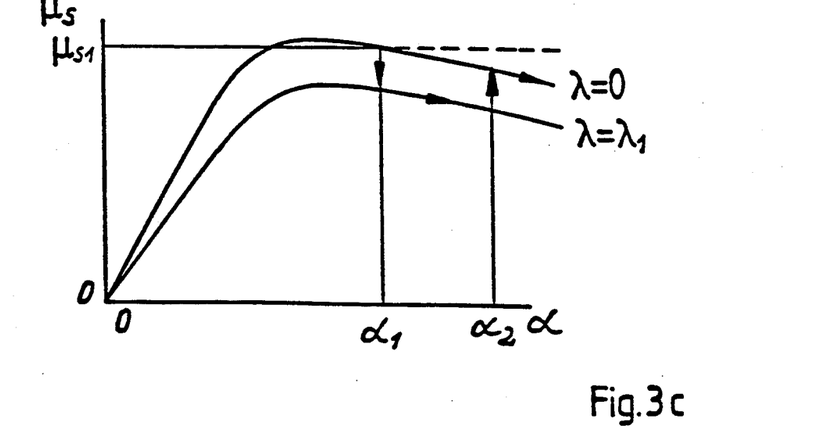
Figure 4A:
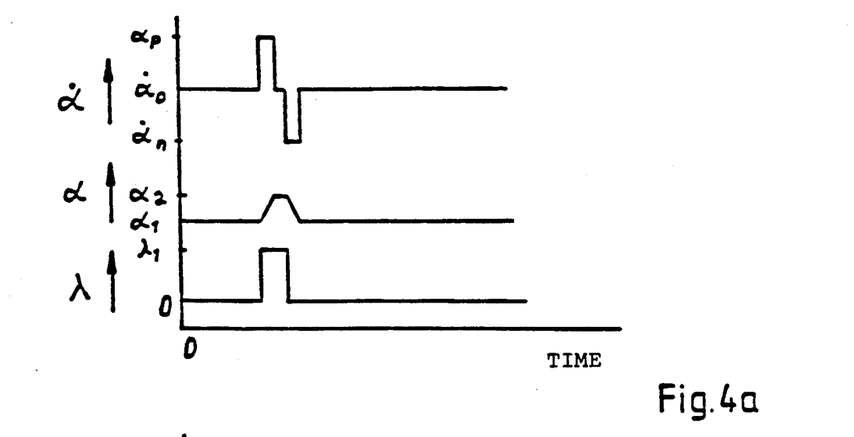
FIGS. 4a, 4b, and 4c are plots of the slippage, steering angle, and change of angle of inclined position against time for slippage curves of respective FIGS. 3a, 3b, and 3c.
Figure 4B:
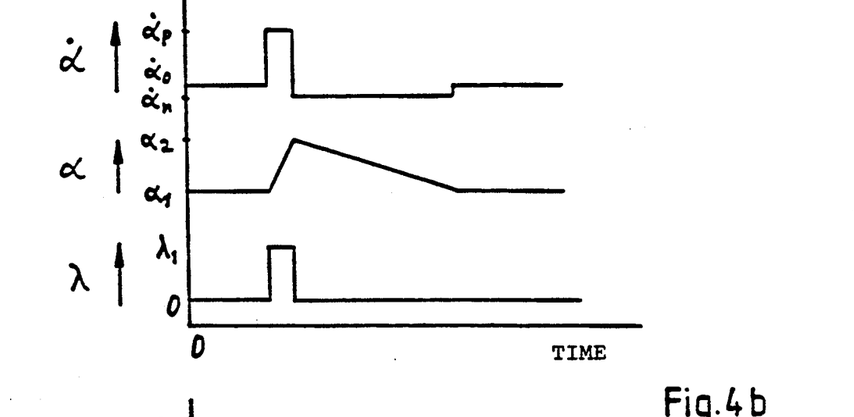
Figure 4C:
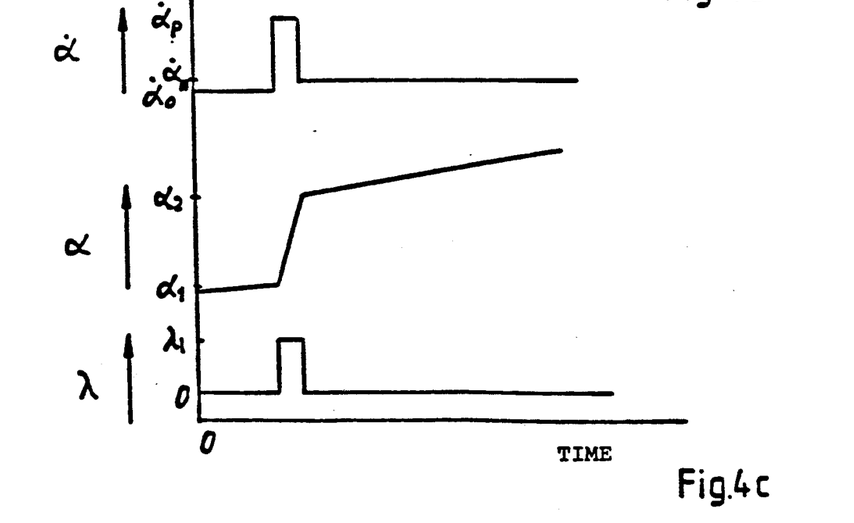

The above described facts are shown in FIGS. 3 and 4 for various initial angles for the inclined position. At the bottom of FIG. 4, there is the brake slippage $\lambda_1$, thereabove is the inclined-position angle $\alpha$ and, finally, FIG. 4 also shows the change of $\alpha$. In FIGS. 3a and 4a, the initial value of the inclined-position angle is in the stable range and the slope of the inclined-position curve is steep. Here, the wheel accelerates fast to reach the initial value $\alpha_1$ of the inclined-position angle after the brake torque has been removed again. In FIGS. 3b and 4b, the initial value $\alpha_1$ of the inclined-position angle is directly before the maximum of the inclined-position curve, hence still in the stable range. When the brake torque is removed again, the wheel accelerates only slowly toward the initial value $\alpha_1$ of the inclined-position angle. In FIGS. 3c and 4c, the initial value $\alpha_1$ of the incline-position angle is behind the maximum of the inclined-position curve, hence in the instable range of the latter. After the removal of the brake torque, the wheel is no longer accelerated toward the initial value of the inclined-position angle. Instead, the wheel continues to move in the same direction and the inclined-position angle continues to increase.

Since the acceleration of the wheel in lateral direction depends upon the magnitude of the brake slippage changes, the acceleration in lateral direction is also referred to the maximum value which occurs during the brake slippage pulse. During travel through a curve, the transverse acceleration already has an initial value $b_{y,o}$.

This initial transverse acceleration is taken into account in the following definition of the transverse stability TSR:

$$TSR = -\frac{b_{y,n} - b_{y,o}}{b_{y,p} - b_{y,o}}$$

wherein $b_{y,p}$ is the transverse acceleration of the wheel during the brake slippage pulse, and $b_{y,n}$ is the transverse acceleration after the brake slippage pulse.

The transverse-stability reserve is hence connected to the instantaneous slope of the inclined-position curve. When calculating TSR, it must be taken into consideration that due to various dead and delay times, the values $b_{y,p}$ and $b_{y,o}$ occur with a time delay with respect to the pressure pulse (which is required for the generation of the brake slippage pulse). The measuring signals are usually distorted and an appropriate filtering of these signal is therefore necessary.

In the embodiment discussed so far, transverse acceleration sensors are preferred at the axles for measuring the transverse accelerations. Alternatively, it is also possible to use a yaw acceleration sensor. The following examples explain how to use the measuring values in order to determine the transverse-stability reserve.

In a 1-channel ABS all wheel brake pressures are known to be modulated together. In order to determine the transverse-stability reserve, FIG. 5 proposes a pulsed increase of the brake pressure at the wheels (bottom of FIG. 5). The transverse accelerations are sensed at the front and the rear axles.

Figure 5:
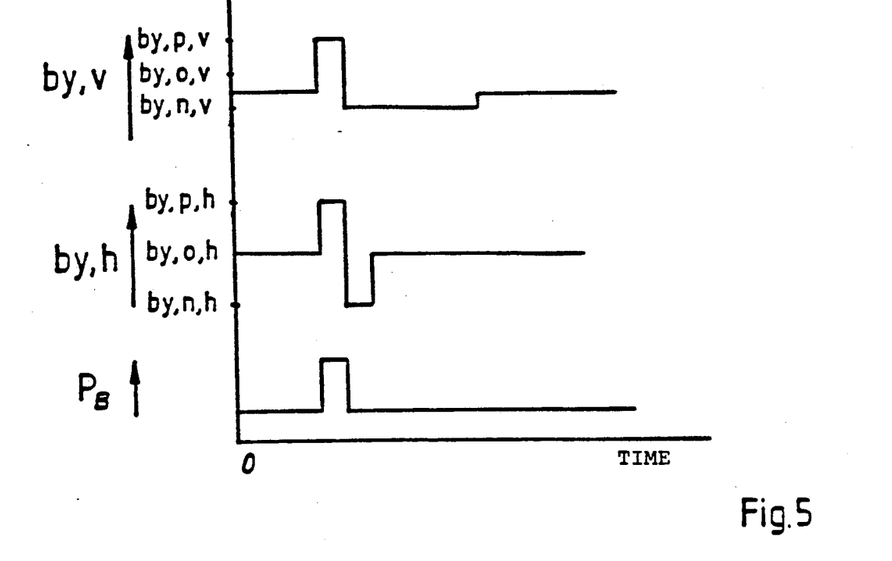
FIG. 5 is a plot of the transverse acceleration of the front and rear wheels against time for a pulse increasing brake pressure.

From FIG. 5, it can be seen that the transverse-stability reserve $$TSRf = -\frac{b_{y,n,f} - b_{y,o,f}}{b_{y,p,f} - b_{y,o,f}}$$

at the front wheel is small since the numerator is small compared to the denominator. Also, according to FIG. 5, the transverse-stability reserve $$TSRr = -\frac{b_{y,n,r} - b_{y,o,r}}{b_{y,p,r} - b_{y,o,r}}$$

at the rear wheel is great since the numerator is approximately equal to the denominator. From values TSRf and TSRr, it can be concluded that the vehicle is stable but has only little steerability reserve. In order to increase the steerability reserve, the overall brake slippage will be slightly reduced.

Figure 6:
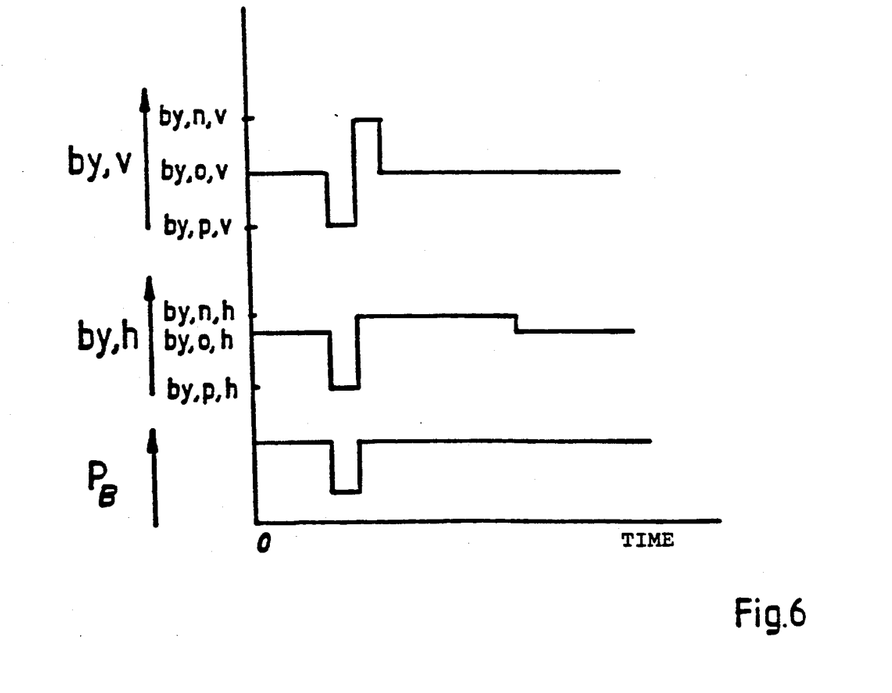
FIG. 6 is a plot of the transverse acceleration of the front and rear wheels against time for a pulse decreasing brake pressure.

In FIG. 6, as opposed to FIG. 5, the brake pressure is not increased but reduced. According to this FIG., transverse-stability reserve $$TSRf = -\frac{by,n,f - by,o,f}{by,p,f - by,o,f}$$

at the front wheel is great since the numerator is approximately equal to the denominator. FIG. 6 also shows that the transverse-stability reserve $$TSRr = -\frac{by,n,r - by,o,r}{by,p,r - by,o,r}$$

at the rear wheel is small since the numerator is much smaller than the denominator. From the values TSRf and TSRr, it may be concluded that the vehicle is close to the stability limit (skidding limit), the steerability limit, however, is far from being reached. The brake slippage will hence also be reduced.

Figure 7A:
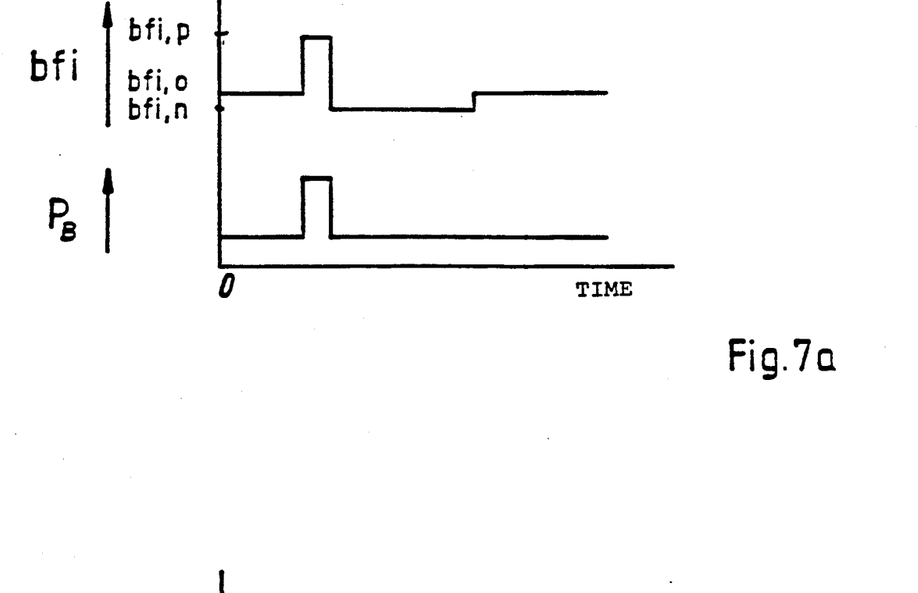
FIGS. 7a and 7b are plots of the yaw acceleration against time for a pulse increasing brake pressure.
Figure 7B:
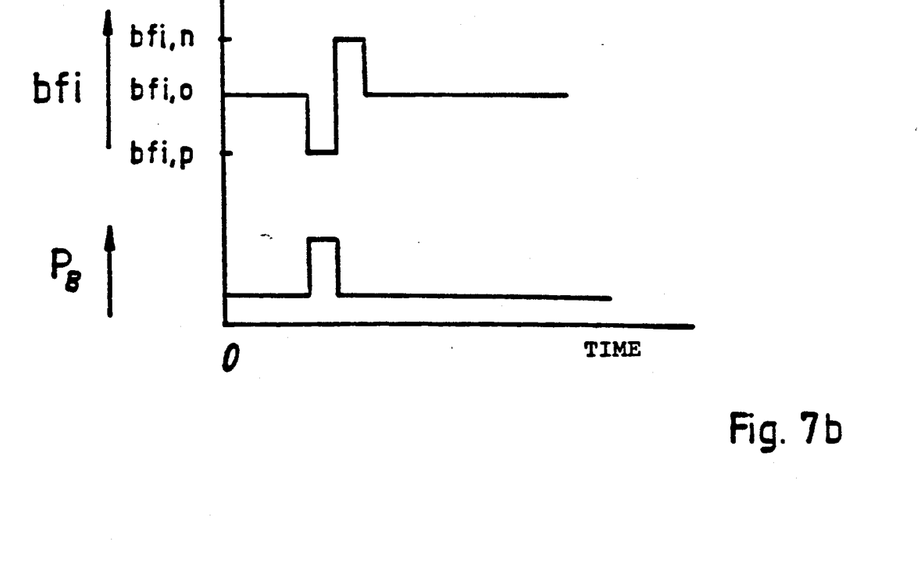
Figure 8A:
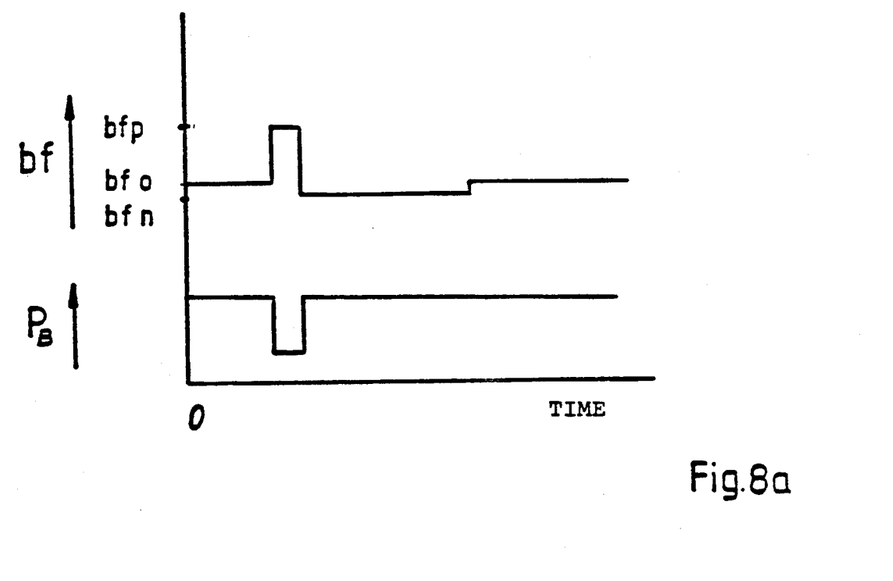
FIGS. 8a and 8b are plots of the yaw acceleration against time for a pulse decreasing brake pressure.
Figure 8B:
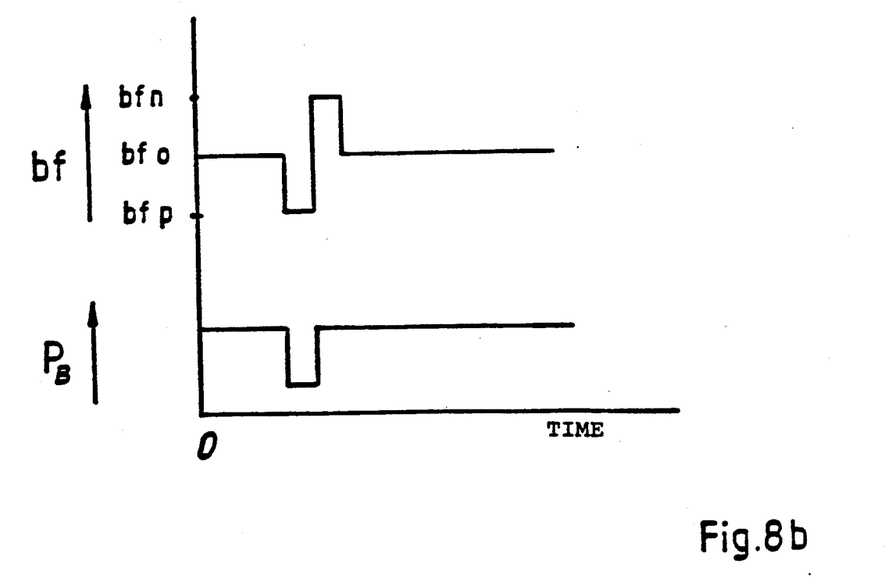

An alternative to transverse acceleration measuring is the use of a yaw acceleration sensor. However, in order to distinguish between steerability and stability, the sign of the steering angle must be included as a signal. These facts are illustrated in FIGS. 7 and 8. In FIG. 7, the brake pressure is increased at all four wheels for a short period of time whereas in FIG. 8, the brake pressure is briefly decreased at all wheels.

In FIG. 7a, a pressure increase (brake slippage increase) triggers a positive yaw acceleration. The small yaw acceleration after the pressure pulse indicates a small transverse-stability reserve $$TSR = -\frac{bfi,n - bfi,o}{bfi,p - bfi,o}$$

wherein bfi,n is the yaw acceleration after the pressure pulse, bfi,p is the yaw acceleration during the pressure pulse and bfi,o is the yaw acceleration before the pressure pulse. The transverse-stability reserve is small since the numerator is small compared to the denominator. When the steering angle has the same sign as the yaw acceleration during the pressure pulse, then the vehicle travels close to the stability limit.

In FIG. 7b, a pressure increase (brake slippage increase) is followed by a negative yaw acceleration whereas after the pressure increase, the measured yaw acceleration is positive The high acceleration after the pressure pulse indicates a great transverse-stability reserve $$TSR = -\frac{bfi,n - bfi,o}{bfi,p - bfi,o}$$

since the numerator is approximately equal to the denominator.

When the sign of the steering angle is the same as the one of the yaw acceleration during the pressure pulse, the vehicle is very stable. When the sign of the steering angle is different from the one of the yaw acceleration during the pressure pulse, the vehicle can be readily steered. Instead of a slippage increase, the transverse-stability reserve can also be determined by decreasing the slippage at the wheel which is subject to braking.

FIGS. 8a and 8b, illustrate the same facts as FIGS. 7a and 7b, however, brake slippage and brake pressure are reduced.

In FIG. 8a, the brake slippage is briefly reduced. During the brake pressure pulse, a positive yaw acceleration bfi,p is measured. The small yaw acceleration bfi,n after the pressure pulse indicates a small transverse-stability reserve $$TSR = -\frac{bfi,n - bfi,o}{bfi,p - bfi,o}$$

since the numerator is small when compared to the denominator. When the sign of the steering angle is the same as the one of the yaw acceleration during the pressure pulse, then the vehicle moves close the steerability limit.

When the sign of the steering angle is different from the one of the yaw acceleration during the pressure pulse, then the vehicle travels close to the stability limit (skidding limit).

In FIG. 8b, the brake slippage is also briefly reduced. During the brake pressure pulse, the measured yaw acceleration is negative. The high yaw acceleration after the brake pressure pulse indicates a great transverse-stability reserve $$TSR = -\frac{bfi,n - bfi,o}{bfi,p - bfi,o}$$

since the numerator is approximately equal to the denominator.

Figure 9A:
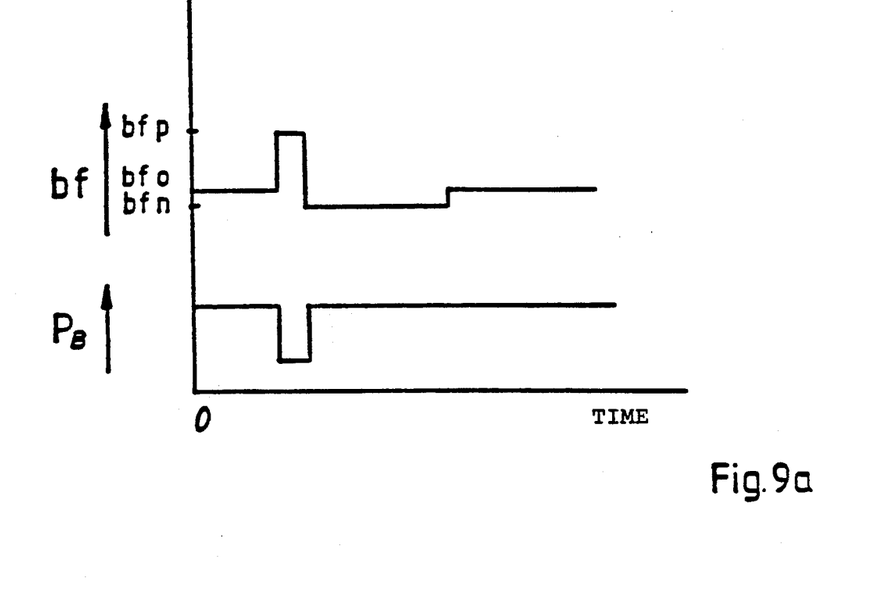
FIG. 9a shows how brake pressure is modulated at the front axle when the wheels are hydraulically combined by their axles in a 2-channel system.

When the sign of the steering angle is different from the one of the yaw acceleration during the pressure pulse, then the vehicle is very stable. When the sign of the steering angle is the same as the one of the yaw acceleration during the pressure pulse, then the vehicle can be readily steered In a 2-channel ABS, the wheels are hydraulically combined either by their axles or diagonally. Other configurations are of course also possible. In case of an axle combination, the transverse-stability reserve can be determined individually for each axle. When diagonally combined, the brake pressure at one axle cannot be modulated independent of the other axle. Even if it were possible to modulate the pressure at only one wheel of one axle, the calculated transverse-stability reserve applies to both wheels together. It is hence not possible to calculate a transverse-stability reserve of one individual wheel. This is no serious disadvantage since the transverse-stability reserve of the wheels on one axle is approximately the same from the beginning (approximately the same inclined position, approximately the same inclined-position curve). In order to calculate the transverse-stability reserve, it is therefore also possible to synchronously modulate the brake pressure in the two diagonals as is the case with a 1-channel ABV. In the diagonal solution, the calculations for TSR are the same as in a 1-channel ABS regardless of whether the diagonals are pressure-modulated individually or when combined In case the wheels are hydraulically combined by their axles, FIG. 9a shows how the pressure is modulated at the front axle, and FIG. 9b this is done at the rear axle. Both Figs. show the measuring of the yaw acceleration bfi of the vehicle It is not necessary to measure the steering angle since the transverse-stability reserve can be calculated individually for each axle.

In FIG. 9a, the brake slippage is briefly reduced. The small yaw acceleration bfi,n after the pressure pulse indicates a small yaw stability reserve $$TSRf = -\frac{bfi,n - bfi,o}{bfi,p - bfi,o}$$

since the numerator is small when compared to the denominator. The vehicle is hence close to the steerability limit.

Figure 9B:
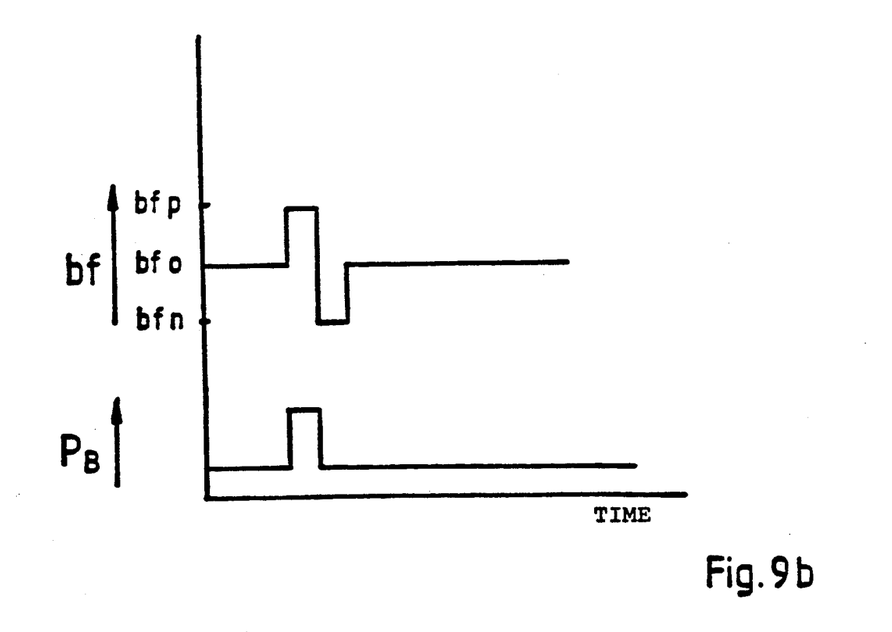
FIG. 9b shows how brake pressure is modulated at the rear axle when the wheels are hydraulically combined by their axles in a 2-channel system.

In FIG. 9b, the brake slippage is briefly increased. The great yaw acceleration after the pressure pulse indicates a great transverse-stability reserve $$TSRr = -\frac{bfi,n - bfi,o}{bfi,p - bfi,o}$$

since the numerator is approximately equal to the denominator.

When, in case the axle-solution is applied, the transverse acceleration by is measured instead of the yaw acceleration bfi, the already given definition of the transverse-stability reserve applies:

$$TSRf = -\frac{by,n,f - by,o,f}{by,p,f - by,o,f}$$

at the rear axle $$TSRr = -\frac{by,n,r - by,o,r}{by,p,r - by,o,r}$$

In 3-channel and 4-channel controls, individual wheels can be independently pressure-modulated. However, this is not recommended in the present case for reasons stated above in connection with the 2-channel ABV.

Since a measuring of the steering angle can also be omitted when measuring the yaw angle acceleration, in case of an axle-related pressure modulation, it is also recommended to combine the wheels of an axle when employing a 3-channel and a 4-channel ABS. The definition of the transverse-stability reserve at the axles is then the same as given under 2-channel ABV with axle combination.

Summarizing, the following can be said:

The ability of a wheel to improve lateral guidance by increasing the inclined-position angle is referred to as transverse-stability reserve TSR.

When TSR is close to 1, then a great amount of lateral guidance can be gained by increasing the inclined-position angle. When TSR is close to 0, then the inclined-position angle is close to the maximum of the inclined-position curve and a change of the inclined-position angle changes lateral guidance only to a very minor extent. When TSR is negative, then the maximum of the inclined-position curve is exceeded and the inclined-position angle is in the instable range of the inclined-position curve.

This statement also applies to the wheels of a vehicle axle. When the transverse acceleration of the axles is measured, then the following definition of the transverse-stability reserve of one axle applies $$TSR = -\frac{by,n - by,o}{by,p - by,o}$$

wherein by,o is the transverse acceleration of the axle before the brake slippage pulse and/or brake pressure pulse, by,p is the transverse acceleration of the axle during these pulses and by,n is the transverse acceleration of the axle thereafter. The brake slippage pulse and/or the brake pressure pulse can be both positive (increase) and negative (reduction).

When the yaw acceleration of the vehicle is measured, then the following definition of the transverse-stability reserve applies $$TSR = -\frac{bfi,n - bfi,o}{bfi,p - bfi,o}$$

wherein bfi,o is the yaw acceleration of the vehicle before the brake slippage pulse and/or the brake pressure pulse, bfi,p is the yaw acceleration of the vehicle during these pulses and bfi,n is the yaw acceleration of the vehicle thereafter. The brake slippage pulse and/or the brake pressure pulse can be both positive (increase) and negative (reduction).

With respect to the measuring of the yaw acceleration of vehicles and axle combination, the association of transverse-stability reserve with axles is unique if the pressure pulses at the axles are generated successively. If there is no individual pressure modulation for the wheels of the front axle and the rear axle when measuring the yaw acceleration of a vehicle, as is the case in 1-channel ABV and 2-channel-ABV with a diagonal solution, the sign of the steering angle must be additionally determined in order to associate the transverse-stability reserve with the steerability or the stability of the vehicle. It must hence be determined whether or not the vehicle has reached the limit of its steerability or the limit of its stability. The following logic operations apply:

TSR means vehicle steerability reserves are present if:

(brake slippage pulse >0) and (bfi,p >0) and (steering angle <0)

(brake slippage pulse >0) and (bfi,p <0) and (steering angle <0)

(brake slippage pulse <0) and (bfi,p >0) and (steering angle >0)

(brake slippage pulse <0) and (bfi,p <0) and (steering angle <0)

TSR means vehicle stability reserves are present if:

(brake slippage pulse >0) and (bfi,p >0) and (steering angle >0)

(brake slippage pulse >0) and (bfi,p <0) and (steering angle <0)

(brake slippage pulse <0) and (bfi,p >0) and (steering angle <0)

(brake slippage pulse <0) and (bfi,p <0) and (steering angle >0)

If the inclined-position angle and/or the lateral guidance are 0, then lateral guidance cannot be changed by modifying the brake slippage. Therefore, it is necessary that the amount of the transverse or yaw acceleration, during the brake slippage pulse, exceed a prescribed threshold which also depends upon the friction coefficient of the road. Further, the accelerations must be high enough and be maintained long enough in order to produce a reliable measurement and not to be lost in measuring noise and strayings.

Dead times and delay times in the entire measuring, filtering and control chain may cause the various signals to occur time-delayed. This must be taken into account when carrying out the calculations.

Due to the transverse-stability reserve at the axles, it is possible to improve the dynamic vehicle reactions by increasing or decreasing the brake slippage at the axles and/or the individual wheels.

The following relations apply:

During an ABS braking, pressure pulses are constantly released. From the reaction of the vehicle in response to these pressure pulses, under consideration of the steering angle, the transverse-stability reserve (TSR) is derived from the front axle and the rear axle.

When the TSR at the front axle is negative or smaller than a prescribed threshold, then the vehicle can no longer or hardly be steered. The pressure in one or in both wheel brake cylinders at the front axle is then gradually decreased until the TSR at the front axle is positive or larger than the prescribed threshold.

Similarly, when the TSR at the rear axle is negative or smaller than the a prescribed threshold, then the vehicle is no longer stable (skidding) or barely stable. The pressure in one or two wheel brake cylinders at the rear axle is then gradually decreased until the TSR at the rear axle is positive and/or larger than the prescribed threshold.

Figure 10:
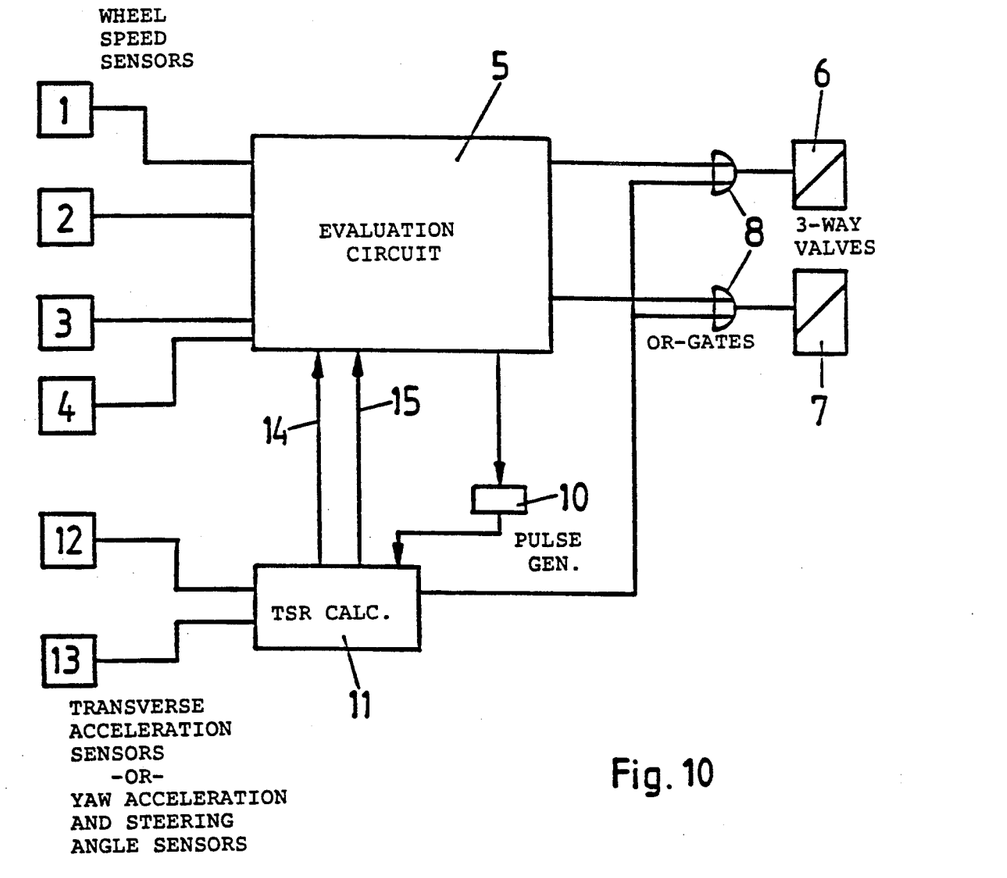
FIG. 10 is a diagram of the ABS with axle-related brake pressure modulation.

FIG. 10 explains an embodiment of the invention. It shows an anti-lock brake control system with axle-related brake pressure modulation. It comprises sensors 1–4 associated with the four wheels, an evaluation circuit 5 and two three-way-valves 6 and 7 each of which is associated with the brakes of one axle. They are actuated in a known way via select-low and/or select-high (possibly switchable).

Phases of constant pressure during a brake control process (ABS or ASR) are fed to a pulse generator 10 which, in such phases, from time to time activates a circuit 11. On the one side, the latter actuates valves 6 and 7 via an OR-gate 8 in the form of pulses so as to either increase or reduce pressure (corresponding to FIG. 5 or FIG. 6, for example). On the other side, this circuit interrogates or partly stores before, during and after the pressure pulse the transverse acceleration values which were determined by the transverse acceleration sensors 12 and 13 which are associated with the wheel axles. The above mentioned transverse stability values TRSf and TRSr are then determined. These values serve to generate signals according to the aforesaid relations which are then fed to the evaluation circuit via lines 14 and 15. These signals determine whether the slippage at the individual axles is to be reduced or increased.

If a yaw acceleration sensor is used as a sensor (e.g. sensor 12), the pressure pulses are supplied successively and axle-related and the yaw acceleration is measured before after and during the pressure pulse.

When the brake pressure is controlled simultaneously at both axles (e.g. diagonal brake circuit), a steering angle sensor (sensor 13) (sign) is required in addition to the yaw acceleration sensor 12.

We claim:

1. Method of improving control of a vehicle during braking, said vehicle having a front axle, a rear axle, at least one wheel at each axle, and brakes which are controlled by brake pressure at each wheel, said wheels exhibiting slippage which determines stability and steerability of the vehicle, said method comprising
   changing said brake pressure in a pressure pulse during phases when said brake pressure is otherwise maintained constant,
   determining a transverse acceleration at each axle before and after said pulse,
   determining for each axle changes in transverse acceleration after said pulse, as compared to before said pulse,
   changing the brake pressures in accordance with said changes in transverse acceleration to modify wheel slippage at each axle so that the steerability is increased when an adequate stability is determined and so that the stability is increased when an adequate steerability is determined.

2. Method of improving control of a vehicle during braking, said vehicle having a front axle, a rear axle, at least one wheel at each axle, and brakes when are controlled by brake pressure at each wheel, said wheels exhibiting slippage which determines stability and steerability of the vehicle, said method comprising
   changing said brake pressure in a pressure pulse during phases when said brake pressure is otherwise maintained constant,
   determining a transverse acceleration at each axle before and after said pulse,
   determining a transverse stability reserve for each axle from changes in transverse acceleration after said pulse, as compared to before said pulse,
   determining a stability reserve and a steerability reserve from the transverse stability reserve for each axle,
   changing the brake pressure to modify wheel slippage at each axle so that the steerability reserve is increased when an adequate stability reserve is determined and so that the stability reserve is increased when an adequate steerability reserve is determined.

3. Method of improving control of a vehicle during braking, said vehicle having a front axle, a rear axle, at least one wheel at each axle, and brakes which are controlled by brake pressure at each wheel, said wheels exhibiting slippage which determines stability and steerability of the vehicle, said method comprising
   changing said brake pressure in a pressure pulse during phases when said brake pressure is otherwise maintained constant,
   determining a yaw acceleration of the vehicle before and after said pulse,
   determining for each axle changes in yaw acceleration after said pulse, as compared to before said pulse,
   changing the brake pressures in accordance with said changes in yaw acceleration to modify wheel slippage at each axle so that the steerability is increased when an adequate stability is determined and so that the stability is increased when an adequate steerability is determined.

4. Method of improving control of a vehicle during braking, said vehicle having a front axle, a rear axle, at least one wheel at each axle, and brakes which are controlled by brake pressure at each wheel, said wheels exhibiting slippage which determines stability and steerability of the vehicle, said method comprising
   changing said brake pressure in a pressure pulse during phases when said brake pressure is otherwise maintained constant, determining a yaw acceleration of the vehicle before and after said pulse, determining a transverse stability reserve for each axle from changes in yaw acceleration after said pulse, as compared to before said pulse, determining a stability reserve and a steerability reserve from the transverse stability reserve for each axle, changing the brake pressure to modify wheel slippage at each axle so that the steerability reserve is increased when an adequate stability reserve is determined and so that the stability reserve is increased when an adequate steerability is determined.

* * * * *